(12) United States Patent
Berko et al.

(10) Patent No.: US 12,339,989 B2
(45) Date of Patent: Jun. 24, 2025

(54) SYSTEM AND METHOD FOR CREATING A DIGITAL FINGERPRINT LIBRARY

(71) Applicant: Acronis International GmbH, Schaffhausen (CH)

(72) Inventors: Nickolay Berko, Shaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 373 days.

(21) Appl. No.: 17/936,409

(22) Filed: Sep. 29, 2022

(65) Prior Publication Data

US 2024/0111887 A1     Apr. 4, 2024

(51) Int. Cl.
*G06F 21/62* (2013.01)
*G06F 21/60* (2013.01)
(Continued)

(52) U.S. Cl.
CPC ........ *G06F 21/6227* (2013.01); *G06F 21/602* (2013.01); *H04W 12/00* (2013.01); *H04W 12/08* (2013.01)

(58) Field of Classification Search
CPC .... G06F 21/6227; G06F 21/602; G06F 21/62; G06F 21/60; H04W 12/00; H04W 12/08
See application file for complete search history.

(56) References Cited

U.S. PATENT DOCUMENTS

| | | | |
|---|---|---|---|
| 10,387,265 | B1 | 8/2019 | Pogosyan et al. |
| 10,817,542 | B2 | 10/2020 | Aseev et al. |

(Continued)

FOREIGN PATENT DOCUMENTS

| | | |
|---|---|---|
| CN | 102802090 B | 1/2015 |
| CN | 108647523 A | 10/2018 |

(Continued)

OTHER PUBLICATIONS

Colón, "Sandboxing Security is vulnerable but not obsolete. Can a Secure Web Gateway with Internet Isolation save the day?" https://www.menlosecurity.com/blog/sandboxes-are-vulnerable-but-not-obsolete-can-a-secure-web-gateway-with-internet-isolation-save-the-day (Year: 2019).*

*Primary Examiner* — Jung W Kim
*Assistant Examiner* — Howard H. Louie
(74) *Attorney, Agent, or Firm* — ESPE Legal Consultancy FZ-LLC (57) ABSTRACT

The invention relates to a system and method that relates to creation of a digital fingerprint library for storing information of a document containing protected information. The system mainly includes a fragment generator, a fingerprint value generator, and the digital fingerprint library. The fragment generator generates fragments of the document using a sliding window method. Fragment length is determined heuristically, can be hardcoded in the program or be a parameter in GUI. The fingerprint value generator generates a fingerprint value, e.g., its hash, for each fragment. The fingerprint value represents the information related to respective fragments. The digital fingerprint library then stores the fingerprint value. Fingerprint values of individual fragments serve as key values to provide a mechanism for comparing fragments of unknown files to the digital fingerprint library.

20 Claims, 4 Drawing Sheets

(51) Int. Cl.
*H04W 12/00* (2021.01)
*H04W 12/08* (2021.01)

(56) References Cited

U.S. PATENT DOCUMENTS

| | | | | |
|---|---|---|---|---|
| 2011/0321160 | A1* | 12/2011 | Mohandas | H04L 63/1416 |
| | | | | 726/22 |
| 2016/0050216 | A1* | 2/2016 | Dubrovsky | G06F 16/182 |
| | | | | 726/1 |
| 2019/0147172 | A1* | 5/2019 | Chen | G06F 16/90344 |
| | | | | 713/193 |
| 2023/0385455 | A1 | 11/2023 | Berko | |

FOREIGN PATENT DOCUMENTS

| | | | |
|---|---|---|---|
| CN | 111049884 | A | 4/2020 |
| CN | 106980680 | B | 11/2020 |
| CN | 112910851 | A | 6/2021 |
| SG | 10201801632 | | 9/2019 |

* cited by examiner

SYSTEM AND METHOD FOR CREATING A DIGITAL FINGERPRINT LIBRARY

FIELD OF THE INVENTION

The invention generally relates to data security. In particular, a system and method are disclosed for creating a digital fingerprint library for files containing protected information.

BACKGROUND OF THE INVENTION

With the advent of technology and ever-evolving cyber security thefts, data security has become a critical issue in all aspects of computer technology. Many enterprises, corporations, unions, organizations, and similar organizations possess valuable information which is vulnerable to data theft. For example, companies in many lines of business typically take steps to protect their intellectual property. Intellectual property may be extremely sensitive, and a company may be at risk if this property is leaked or stolen.

Private network security is often used to prevent data theft or data leakage. Data may have to be shared as a result of operations involving file sharing or collaborative work between enterprises on a daily basis and for ad hoc alliances. Entities frequently come together to function as a joint venture or share data with third parties. This collaboration may require company network users to share data through the private network, including email, short-message-service, instant messages, or other forms of data transfer. There is a risk that the user may, intentionally or unintentionally, share protected data with a recipient not authorized to access that data. Various data security systems have been implemented to prevent such incidents. The systems are typically configured to verify the outgoing data with a private database of the known files containing protected information before the sharing process.

Document fingerprinting is a technique to prevent data leakage. This technique calculates a value that corresponds to a document and identifies a relatively high degree of certainty. A database of protected information may contain fingerprints, such as hash values of the protected documents and may compare the fingerprint value of an attached document with the fingerprint values stored in the database to verify if the attached document contains protected information. If both fingerprint values match, the system identifies the document as containing proprietary information. In addition, the system optionally may not allow the user to share the document. For example, if the user wishes to share a document with a third party via email, the system may verify the attachment or the content of the email against the digital fingerprint library using this disclosure.

Though these systems are effective at identifying protected documents, a problem arises when a user shares a document that contains only fragments of documents with protected data rather than copying one of original known documents in its entirety. Comparing hashes or other fingerprint values of the entire set of known documents will not provide security in such cases. There is a need for a system and method capable of identifying fragments of documents containing protected data in unknown files.

SUMMARY OF THE INVENTION

The present disclosure relates to a system and method for creating a digital fingerprint library (DFL) to store information about fragments of fixed-width files containing protected information. Once the library is created, every new unknown file can be broken into fragments of some length, overlapping or not. Information about each one of these fragments is compared to the information stored in the digital fingerprint library (DFL). Hash values are an example of information used for such a comparison. That check may be performed before a file is sent to an external recipient, copied to an external storage, or otherwise leaves the secure perimeter of a protected or trusted system.

In one embodiment, a method for creating the digital fingerprint library include receiving a file containing protected information (FCPI), generating fragments of the file using a sliding window method that further includes obtaining a fragment of length N from the file. The fragment starts from a first character of the file, obtains the next fragment by removing the first character of the fragment and sliding to a second character of a file. The second character of the file becomes the first character of the next fragment. The step of obtaining the fragment is repeated till a last character of the file is enumerated by the last fragment of the file. The method further includes assigning a hash value to each fragment and storing each hash value into the digital fingerprint library, where each fragment is stored in the digital fingerprint library as the respective hash value.

In an embodiment, the method includes storing each fragment that contains data related to protected information according to hierarchical classification of a data protection policy.

In an embodiment, the method includes determining the length N of the fragment heuristically.

In an embodiment, the method includes pre-processing the FCPI file before fragmentation. The method step of pre-processing comprises classifying the file based on a document type, an image type, and a video type. Other steps include extracting unformatted text from the documents containing text, formatting the document file for converting the text into a uniform format, removing all punctuation marks, removing all spaces, replacing all non-Latin characters based on a set of predefined rules, and changing sliding window method to slide from a first character of first word to a first character of second word. Further steps include performing, for a binary file, decompilation of the file and processing the decompiled file as a text file. Formatting segments are removed from the file and the formatting segments include header, footer, salutation, and signatures.

In an embodiment, the method includes adding each fragment that starts with a first character of word or a first character of sentence to the digital fingerprint library.

In an embodiment, the method includes adding the fragments from the FCPI that were not already stored in the digital fingerprint library (DFL) previously.

In an embodiment, the method includes configuring the length of a sliding window using a Graphical User Interface (GUI).

In an embodiment, the method includes removing, from the digital fingerprint library (DFL), a fragment that exists in a file available in a public domain (FAPD) by comparing information of such a fragment from a FAPD to the fragment in DLF.

In an embodiment, the method includes storing additional statistical information about each fragment to the digital fingerprint library. The additional statistical information includes a number of unique files containing the fragment.

In an embodiment, the method includes specifying one or more locations where one or more files containing protected data are stored in the digital fingerprint library. In this embodiment, each fragment may contain information about each known file that contains the fragment, such as the physical location of that file.

In an embodiment, a system is disclosed for creating a digital fingerprint library of fragmented files containing protected information (FCPI). The system includes a fragment generator to generate fragments of the file using a sliding window method. The fragment generator is configured to obtain a fragment of length N from the file, where the fragment starts from a character at position I (e.g., the first character of the file), obtain next fragment by moving the sliding further window by S characters (e.g., by 1 character or symbol) where the character at the position I+S of the file becomes first character of the next fragment, repeat the step with constant or varying step S of obtaining the fragment till until the fragment of length that starts with the next starting character exists in the file. At some point, the iterative process will move to such a character that the N-window that starts with that character will end outside of the end of the file, i.e., that starting character is less than N characters from the end of the file.

In an embodiment, the system further includes a hash value generator to assign a hash value to each fragment, and a digital fingerprint library (DFL) configured to store each hash value generated for each fragment.

The foregoing general description of the illustrative embodiments and the following detailed description thereof are merely exemplary aspects of the teachings of this disclosure and are not restrictive.

DETAILED DESCRIPTION

A digital fingerprint library is a kind of a database where information related to fragments files containing protected data are stored.

Protected information refers generally to information whose distribution is governed by certain policies or procedures. This includes trade secrets, research and development, ideas for patenting, confidential and proprietary business information of the company, and any other information of the company. Other examples include customer lists (including potential customers), sources of supply, processes, plans, materials, pricing information, internal memoranda, marketing plans, internal policies, and products and services which may be developed from time to time by the Company and its agents or employees.

A digital fingerprint library stores information about fragments of documents. In the context of computer security, a digital fingerprint library stores fragments of documents containing protected information. To determine if an unknown document contains protected information, the content of the document is compared with the content of the digital fingerprint library, specifically, information about fragments from that document generated with a sliding window process is compared to the information about fragments from the known files that contain protected information that are already stored in that library. Based on the results of the comparison, a decision is made about whether the unknown file contains protected information.

Figure 1:
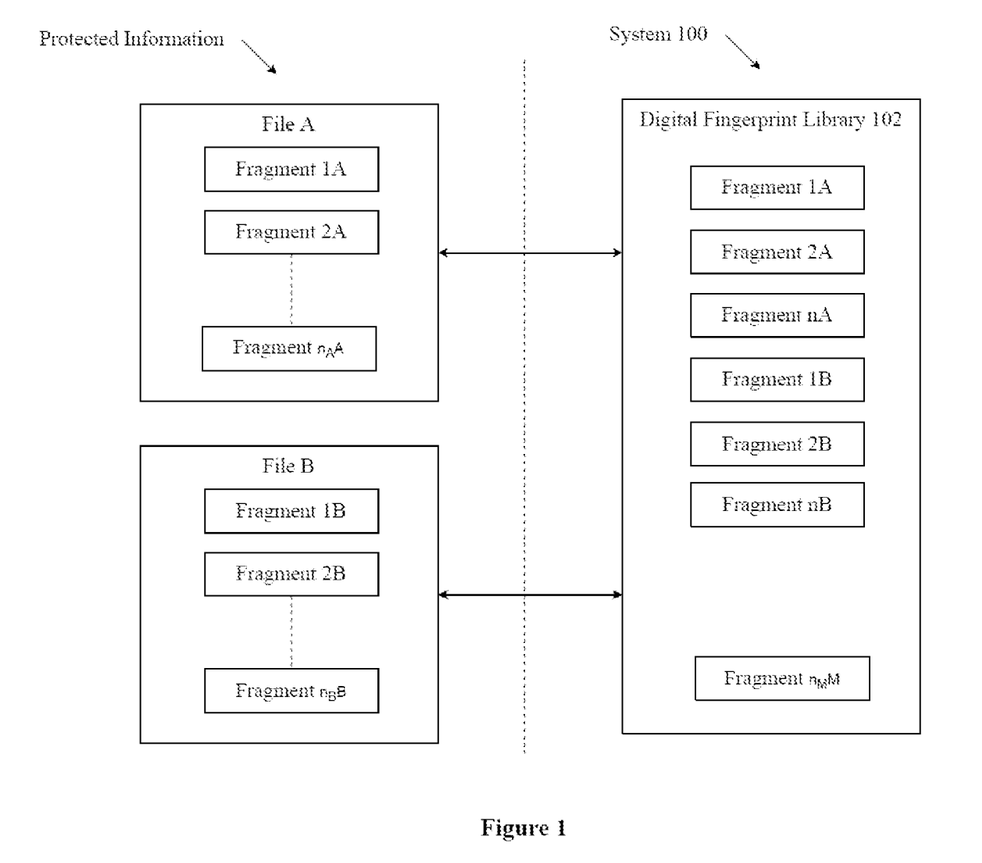
FIG. 1 is an overview of a system, in accordance with one implementation of an embodiment.

FIG. 1 is an overview of system 100, in accordance with one implementation of an embodiment. As shown in FIG. 1, all files known to contain protected information are processed to generate N-fragments of these files and to store information about these fragments in Digital Fingerprint Library 102.

The protected information, in the form of various files, may be labeled as protected and classified based on degree of sensitivity, and fingerprints of fragments of such documents can be stored in a database. In one embodiment, the fingerprint of the fragment is its hash.

In an embodiment, information about the sensitivity level of the file containing the fragment is stored along with the fragment's fingerprint.

The present disclosure implements a sliding window method, which is described in detail with reference to FIG. 3. In one implementation, each file is processed to generate one or more fragments containing N symbols from the file. Each fragment is assigned a hash value as its fingerprint, and then the hash value is stored in the fingerprint library. For example, a given Document A may contain $n_A$ fragments. Fragment 1A, fragment 2A, up to fragment $n_A$A, represent a string of N continuous symbols selected according to a certain algorithm. Fingerprints of each fragment are stored in the fingerprint library.

Similarly, a given file B contains $n_B$ fragments, fragment 1B, fragment 2B, fragment $n_B$B, and information about each fragment is stored in the digital fingerprint library 102. In one implementation, only fragments that have not already been stored in the digital fingerprint library 102 will be stored.

In one embodiment, the digital fingerprint library 102 is a database configured to store the fingerprints of fragments.

In an embodiment, a unique hash value is generated for each fragment. The hash value corresponding to each fragment is stored in the digital fingerprint library as a fingerprint of the fragment.

In an embodiment, the digital fingerprint library 102 contains additional statistical information about each fragment. Thus, there are a number of unique files that reference a specific fragment.

In an embodiment, the digital fingerprint library 102 includes one or more locations specifying where files containing the protected data are stored.

In an embodiment, the fingerprint library is implemented on a physical memory storage device within a private network.

In an embodiment, the fingerprint library is implemented in a cloud database.

Figure 2:
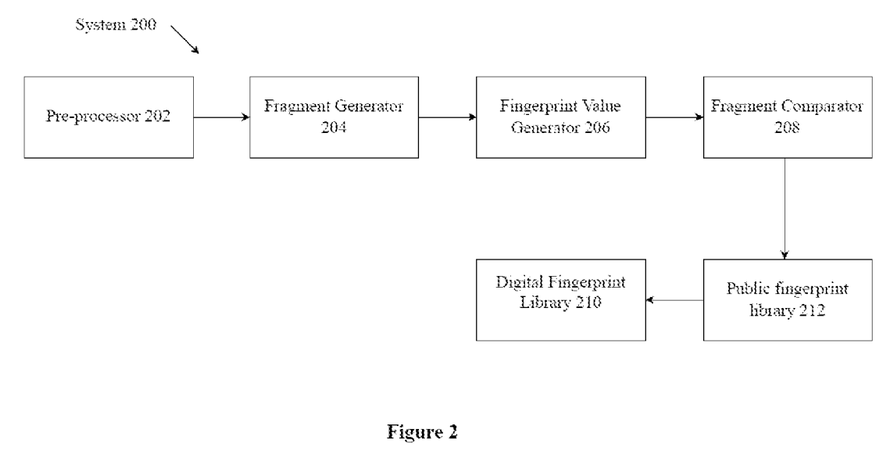
FIG. 2 is a block diagram of the system for creating the fingerprint library, in accordance with one implementation of the present embodiment.

FIG. 2 is a block diagram of system 100 for creating the fingerprint library, in accordance with one embodiment. The system 100 includes an optional pre-processor 202, a fragment generator 204, a fingerprint value generator 206, an optional fragment comparator 208, a digital fingerprint library 210, and a public fingerprint library 212.

As described with reference to FIG. 1, a file containing protected information is processed before creating the fingerprints. The optional pre-processor 202 is configured to perform pre-processing operations on the file.

In one embodiment, the file containing protected information may be in various forms and formats, for example, a video file, a text file, a multimedia format, a voice recording, an image format, or a binary format. All formats may be converted to a predefined uniform format. Various preprocessing operations may then be performed on the file based on the type of the file.

In one embodiment, unformatted text is extracted from the file.

In one embodiment, text is formatted as per a uniform formatting standard. Examples of the formatting process are various formatting and grammatical rules, such as removing a double space from two adjacent words, enforcing a single space after a comma, and the like. In one embodiment, all punctuation marks from the document are removed. In one embodiment, the spaces are removed. In one embodiment, all non-Latin characters are replaced according to certain predefined rules. For example, one character for one non-Latin character or one or more characters for one non-Latin character to accommodate alphabets with a number of characters larger than the number of characters in Latin alphabets can be implemented. In one embodiment, a sliding window step may be changed from one character to a sliding of one character in one word to the first character of the next word. In one embodiment, for a binary file, first decompilation is performed, followed by processing of the decompiled version as a text file. In one embodiment, formatting segments, such as headers and footers, are removed. In one embodiment, standard fragments, such as salutations (e.g., "dear reader") and signatures (e.g., "Administration") are removed.

In another embodiment, a preprocessed file is received by the fragment generator 204 to generate fragments of length N (N-fragments) of the file. The fragment generator 204, in one embodiment, is a component comprising software, hardware, or both that is, configured to generate fragments of length N of the file. The N-fragments are generated using the sliding window method, described in detail with reference to FIG. 3. The fragment generator 204 initiates the fragmentation process from the character S(1). This is the first character of the file or some other character or symbol in the file calculated according to a certain rule. The first N-fragment consists of continuous N symbols from the file that start with the character or symbol C(1). The N-fragment number i+1 is determined by moving the first character of the N-fragment C(i) by S(i+1) positions, where S(i+1) may be a constant, e.g., equal to 1, or calculated based on a certain rule. The N-fragment number i+1 consists of N continuous characters or symbols from the file starting with the position C(i+1).

The process of fragment generation continues until the next step cannot generate an N-fragment anymore because the next starting character or symbol is closer to the end of the file than N, or if some other criteria is met.

The fingerprint generator is configured to receive the fragments generated by the fragment generator 204 and generate a fingerprint value for each fragment. The fingerprint generator may use the fragment itself as its fingerprint value. In an embodiment, a hash of a fragment is its fingerprint value. A hashing algorithm takes as input a value and outputs a fixed-length value normally of a smaller size that has a property such that if two fragments have different values, the probability is high that the fragments are different as well.

In one embodiment, the optional public fingerprint library 212 is configured to identify the fragments that exist in the public domain. The fragment comparator 208 is configured to compare the fingerprint of the new fragment of the file with fingerprints of the fragments stored in the public fingerprint library 212. If the fingerprint of the fragment is already stored in the public fingerprint library 212, that fragment is not stored in the digital fingerprint library 102. The fingerprint value for each fragment is received by the optional fragment comparator 208 for comparing the fragments generated by the fragment generator 204 with the fragments previously stored in the digital fingerprint library 102, in accordance with one embodiment. In that embodiment, if the fingerprint of the fragment being stored matches with the fingerprint of a fragment that already exists in the from the digital fingerprint library 102, the fragment is not stored, thereby avoiding the duplication. If the fingerprint of the new fragment does not match any of the fingerprints in the digital fingerprint library 102, the fingerprint of that fragment is added to the digital fingerprint library 102.

Figure 3:
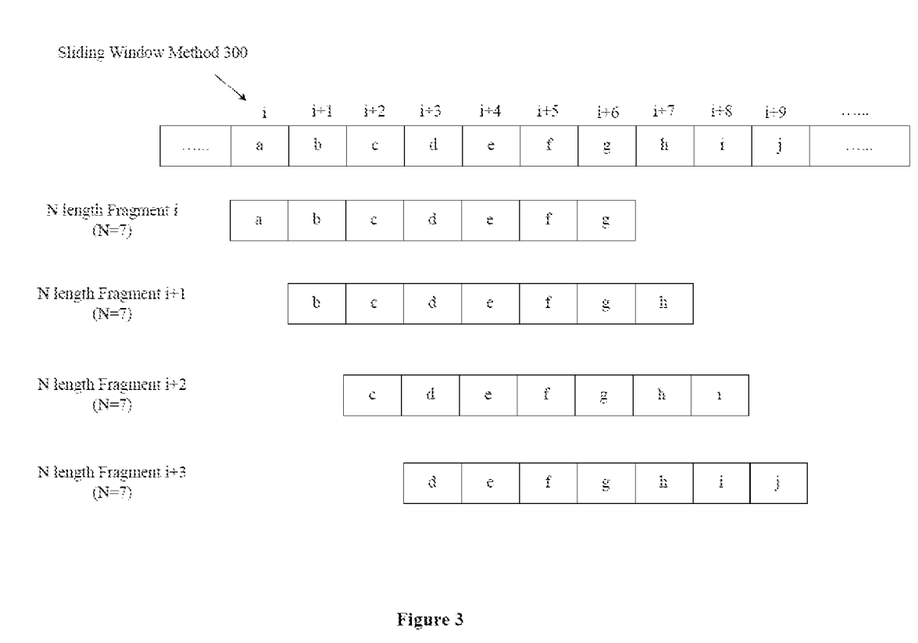
FIG. 3 illustrates a fragment generator implementing a sliding window method to generate fragments, in accordance with one implementation of the present embodiment.

FIG. 3 illustrates a fragment generator 204 implementing a sliding window method to generate fragments in accordance with one embodiment. FIG. 3 shows the simplest example of the sliding window method that starts with the first character or symbol of the file and keeps shifting right by one character or symbol with each iteration. Sliding iterations are carried out until there are not enough characters or symbols in the file to generate an N-fragment that starts with the next character or symbol. The actual sliding window method can start with a character or symbol other than the first one and can use an iteration step that is of fixed or varying size according to a certain formula or criterion. The sliding window process may end when the next iteration cannot produce an N-fragment anymore. This happens when the starting character or symbol is closer to the end of the file than N characters or some other criteria are met.

FIG. 3 illustrates one example of the sliding window method implemented by the fragment generator 204. A string of the file to be stored in the digital fingerprint library 102 is of size K>9. The 10 characters are "a", "b", "c", "d", "e", "f", "g", "h", "j", and "k" where "a" is the first character where the first iteration starts, and "k" is the last character. The size of a sliding window is N=7. The starting element of the sliding window is denoted by i.

The first iteration, i, of the sliding window of the size N=7, starts at the position i. Fragment #i starts with the element in the position i, the character "a." The iteration ends with the element at the position i+6, the character "g". Therefore, the fragment #i contains the characters "abcdefg."

The next iteration, i+1, of the sliding window of the size N=7, starts at the position i+1. Fragment #i+1 starts with the element in the position i+1, the character "b." The iteration ends with the element at the position i+7, the character "h." Therefore, the fragment #i+1 contains the characters "bcdefgh."

The next iteration, i+2, of the sliding window of the size N=7, starts at the position i+2. Fragment #i+2 starts with the element in the position i+2, the character "c." The iteration ends with the element at the position i+8, the character "j." Therefore, the fragment #i+2 contains the characters "cdefghj."

The next iteration, i+3, of the sliding window of the length N=7, starts at the position i+3. Fragment #i+3 starts with the element at the position i+3, the character "d." The iteration ends with the element at the position i+9, the character "k." Therefore, the fragment #i+3 contains the characters "defghjk."

If K is the length of the file, the sliding window that starts with the first symbol of the file and moves by one symbol each iteration, produces K−N+1 N-fragments. Other sliding window methods produce fewer fragments. Each N-fragment is assigned a fingerprint value and that fingerprint value is stored in the digital fingerprint library 102. That fingerprint is a value that identifies the N-fragment with a high degree of certainty. This may be the value of the N-fragment itself or its hash value.

Figure 4:
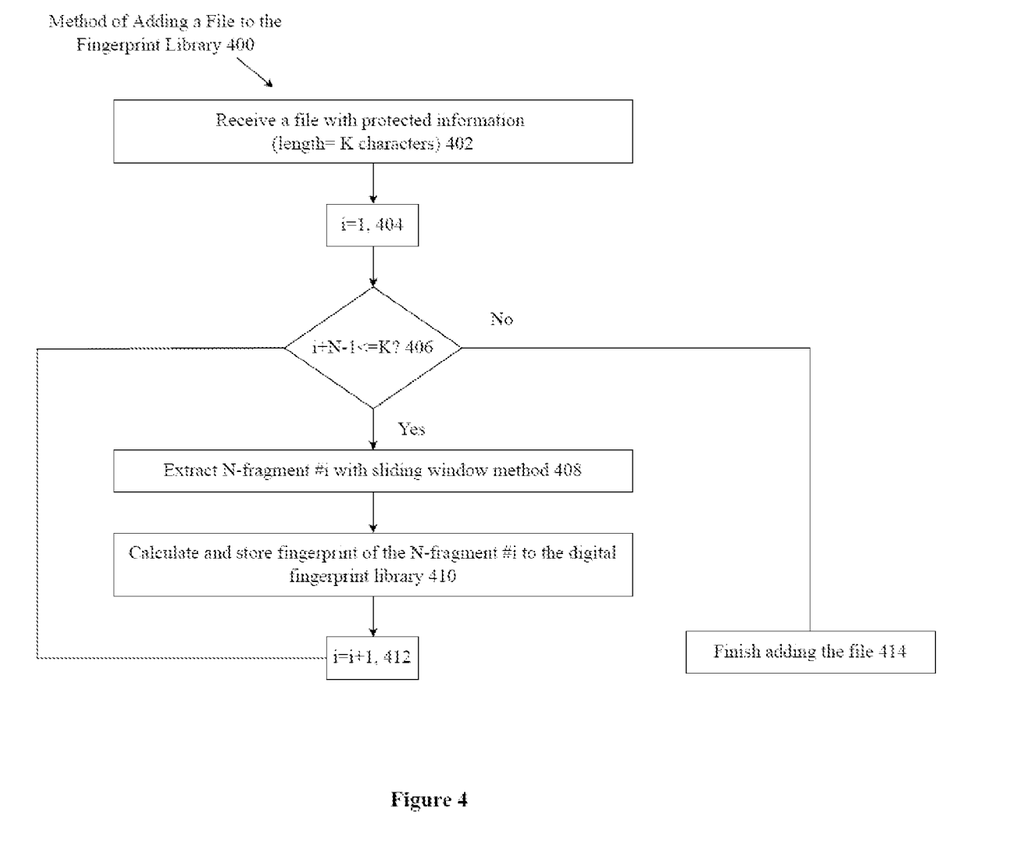
FIG. 4 is a flowchart representing a creation of the digital fingerprint library, in accordance with one implementation of the present embodiment.

FIG. 4 is a flowchart representing addition of a new file containing protected information to the digital fingerprint library 102, in accordance with one embodiment. At step 402, a file with protected information is received by the system 100. The counter of element i is set at 1 (i=1) at step 404. At step 406, it is determined whether the next fragment must be generated or not. This depends on whether the first character of the next iteration will be closer than N to the end of the file or note. The fragment generation steps are repeated till the next starting character is closer to the end of the file than N, thus making it impossible to generate an N-fragment from the file. In an embodiment, a different criterion is used to end the sliding window process.

If the condition at step 406 is true, fragment #i of size N is generated using the sliding window method at step 408. A fingerprint of the extracted N-fragment is calculated and stored to the digital fingerprint library 102 at step 410. Once the fingerprint of the fragment #i is stored, the method moves to the next iteration and the next fragment is generated using the sliding window method at step 412. The iteration counter i is increased by 1, and the window slides by 1 symbol.

If the condition at step 406 is false, the fragment generation process is finished at step 414, in accordance with one embodiment. In general, a different criteria may be used to end the sliding window process.

The invention claimed is:

1. A computer-implemented method for protecting digital data from unauthorized removal from a secure perimeter, the method comprising:
  receiving digital data containing protected information, the digital data being previously classified into a hierarchical security classification based on a degree of sensitivity of the protected information in the digital data;
  generating, by a microprocessor, a plurality of fragments of the digital data,
  wherein the step of generating the fragments of the digital data further comprises
    obtaining a fragment of length N from the digital data, wherein the fragment starts from a character at a position C(l) of the digital data,
    obtaining fragment number i+1 by moving a pointer C(i) to the first character of the N-fragment i by S(i+1) positions and obtaining a fragment of length N of continuous characters or symbols starting with a character or symbol at a position C(i)+S(i+1); and
    repeating the step of obtaining the fragment until a next N-fragment in iteration cannot be obtained;
  assigning a plurality of first fingerprints corresponding to each of the plurality of fragments;
  storing the plurality of first fingerprints in a digital fingerprint library with an assigned hierarchical security level corresponding to the digital data, wherein the hierarchical security level is according to a hierarchical classification of a data protection policy of a system executing to prevent the protected information from leaving the secure perimeter;
  receiving, within the secure perimeter, unknown digital data;
  generating, by the microprocessor, a plurality of fragments of the unknown digital data, wherein the step of generating the fragments of the unknown digital data further comprises:
    obtaining a new fragment of length N from the unknown digital data, wherein the new fragment starts from a character at a position C(l) of the unknown digital data,
    obtaining new fragment number i+1 by moving a pointer C(i) to the first character of the new N-fragment i by S(i+1) positions and obtaining a new fragment of length N of continuous characters or symbols starting with a character or symbol at a position C(i)+S(i+1); and
    repeating the step of obtaining the new fragment until a next N-fragment in iteration cannot be obtained;
  assigning a plurality of second fingerprints corresponding to each of the plurality of fragments generated from the unknown data;
  searching the digital fingerprint library for a first fingerprint matching one of the plurality of second fingerprints; and
  blocking the unknown digital data from leaving the secure perimeter if one of the plurality of second fingerprints matches one of the plurality of first fingerprints in the digital fingerprint library to prevent access to the protected information outside of the secure perimeter.

2. The method of claim 1, wherein the plurality of first and second fingerprints are hash values.

3. The method of claim 1, wherein the unknown digital data comprises a file.

4. The method of claim 3, wherein the file comprises respective digital data created within the secure perimeter.

5. The method of claim 4, wherein the unknown digital data is scheduled to be moved outside the secure perimeter and the blocking step takes place before the scheduled movement.

6. The method of claim 1, wherein the storing the plurality of first fingerprints includes storing only first fingerprints that have not already been stored in the digital fingerprint library.

7. A system for protecting digital data from unauthorized removal from a secure perimeter, the system comprising:
  digital data containing protected information inside the secure perimeter, the digital data being previously classified into a hierarchical security level based on a degree of sensitivity of the protected information in the digital data;
  a microprocessor, coupled to a nontransitory storage medium,
  a fragment generator, under microprocessor control, the fragment generator configured to
  obtain a plurality of fragments of length N from the digital data;
  wherein the microprocessor is further configured to:
    assign a plurality of first fingerprints corresponding to each of the plurality of fragments of the digital data; and
    store the plurality of first fingerprints in a digital fingerprint library (DFL) with an assigned hierarchical security level corresponding to the digital data, wherein the hierarchical security level is according to a hierarchical classification of a data protection policy of a system executing to prevent the protected information from leaving the secure perimeter;
  a source of unknown digital data in a second storage medium inside the secure perimeter;

wherein the fragment generator is further configured to obtain a plurality of fragments of length N from the unknown digital data, comprising:
 obtaining a fragment of length N from the unknown digital data, wherein the fragment starts from a character at a position C(l) of the unknown digital data,
 obtaining fragment number i+1 by moving a pointer C(i) to the first character of the N-fragment i by S(i+1) positions and obtaining a fragment of length N of continuous characters or symbols starting with a character or symbol at a position C(i)+S(i+1), and
 repeating the step of obtaining the fragment until a next N-fragment in iteration cannot be obtained;
wherein the microprocessor is further configured to:
 assign a plurality of second fingerprints corresponding to each of the plurality of fragments of the unknown digital data; and
 store the plurality of second fingerprints in the digital fingerprint library;
a comparator, under microprocessor control, configured to find fingerprints in the DFL matching second fingerprints generated from the unknown digital data;
wherein the microprocessor is further configured to block the unknown digital data from leaving the secure perimeter if the comparator finds that one of the plurality of second fingerprints matches one of the plurality of first fingerprints in the digital fingerprint library to prevent access to the protected information outside of the secure perimeter.

8. The system of claim 7, wherein the plurality of first and second fingerprints are hash values.

9. The system of claim 7, wherein the unknown digital data comprises a file.

10. The system of claim 9, wherein the file was created within the secure perimeter.

11. The system of claim 10, wherein the fragment generator is configured to generate fragments from the unknown digital data before the unknown digital data leaves the secure perimeter.

12. The system of claim 10 wherein the comparator is configured to find matching fingerprints in the DFL before the unknown digital data leaves the secure perimeter.

13. The system of claim 7, wherein the microprocessor is further configured to store the plurality of first fingerprints in the DFL including storing only first fingerprints that have not already been stored in the DFL.

14. A computer-implemented method for protecting digital data from unauthorized removal from a secure perimeter, the method comprising:
 providing a digital fingerprint library including a plurality of first fingerprints corresponding to a plurality of first fragments stored in the digital fingerprint library and an assigned hierarchical security level, each of the plurality of first fingerprints defined based on respective digital data containing protected information, the digital data being previously classified into a hierarchical security classification based on a degree of sensitivity of the protected information in the digital data, wherein the assigned hierarchical security level is according to a hierarchical classification of a data protection policy of a system executing to prevent the protected information from leaving the secure perimeter;
 receiving, within the secure perimeter, unknown digital data;
 generating, by a microprocessor, a plurality of fragments of the unknown digital data, wherein the step of generating the fragments of the unknown digital data further comprises:
  obtaining a fragment of length N from the unknown digital data, wherein the fragment starts from a character at a position C(l) of the unknown digital data,
  obtaining fragment number i+1 by moving a pointer C(i) to the first character of the N-fragment i by S(i+1) positions and obtaining a fragment of length N of continuous characters or symbols starting with a character or symbol at a position C(i)+S(i+1), and
  repeating the step of obtaining the fragment until a next N-fragment in iteration cannot be obtained;
 assigning a plurality of second fingerprints corresponding to each of the plurality of fragments generated from the unknown data;
 searching the digital fingerprint library for a first fingerprint matching one of the plurality of second fingerprints; and
 blocking the unknown digital data from leaving the secure perimeter if one of the plurality of second fingerprints matches one of the plurality of first fingerprints in the digital fingerprint library to prevent access to the protected information outside of the secure perimeter.

15. The method of claim 14, wherein the plurality of first and second fingerprints are hash values.

16. The method of claim 14, wherein the unknown digital data comprises a file.

17. The method of claim 16, wherein the file comprises respective digital data created within the secure perimeter.

18. The method of claim 14, wherein the unknown digital data is scheduled to be moved outside the secure perimeter and the blocking step takes place before the scheduled movement.

19. The method of claim 14, wherein fragments are generated from the unknown digital data before the unknown digital data leaves the secure perimeter.

20. The method of claim 14, wherein the secure perimeter is associated with a protected or trusted system.

* * * * *